United States Patent
Ling et al.

(10) Patent No.: US 9,000,061 B2
(45) Date of Patent: Apr. 7, 2015

(54) FOAMS AND ARTICLES MADE FROM FOAMS CONTAINING 1-CHLORO-3,3,3-TRIFLUOROPROPENE (HFCO-1233ZD)

(75) Inventors: Yiu Keung Ling, Amherst, NY (US); David J Williams, East Amherst, NY (US)

(73) Assignee: Honeywell International Inc., Morristown, NJ (US)

( * ) Notice: Subject to any disclaimer, the term of this patent is extended or adjusted under 35 U.S.C. 154(b) by 250 days.

(21) Appl. No.: 13/191,070

(22) Filed: Jul. 26, 2011

(65) Prior Publication Data

US 2011/0303867 A1    Dec. 15, 2011

Related U.S. Application Data

(63) Continuation-in-part of application No. 12/847,381, filed on Jul. 30, 2010, and a continuation-in-part of application No. 12/176,137, filed on Nov. 21, 2008, now abandoned, and a continuation-in-part of application No. PCT/US2007/064570, filed on Mar. 21, 2007, which is a continuation of application No. 11/474,887, filed on Jun. 26, 2006.

(60) Provisional application No. 61/368,246, filed on Jul. 27, 2010, provisional application No. 61/509,045, filed on Jul. 18, 2011, provisional application No. 61/232,836, filed on Aug. 11, 2009, provisional application No. 60/989,977, filed on Nov. 25, 2007, provisional application No. 60/784,731, filed on Mar. 21, 2006.

(51) Int. Cl.
| | | |
|---|---|---|
| C08J 9/00 | (2006.01) |
| C08L 75/04 | (2006.01) |
| C08G 18/18 | (2006.01) |
| C08G 18/40 | (2006.01) |
| C08J 9/14 | (2006.01) |
| C08G 101/00 | (2006.01) |

(52) U.S. Cl.
CPC ........ *C08G 18/1808* (2013.01); *C08G 18/1816* (2013.01); *C08G 18/4018* (2013.01); *C08J 9/144* (2013.01); *C08J 9/149* (2013.01); *C08G 2101/0016* (2013.01); *C08G 2101/0025* (2013.01); *C08G 2101/005* (2013.01); *C08G 2105/02* (2013.01); *C08J 2375/04* (2013.01)

(58) Field of Classification Search
USPC .................................. 521/98, 131, 137, 138
See application file for complete search history.

(56) References Cited

U.S. PATENT DOCUMENTS

| | | |
|---|---|---|
| 2,834,748 A | 5/1958 | Bailey et al. |
| 2,846,458 A | 8/1958 | Haluska |

(Continued)

FOREIGN PATENT DOCUMENTS

| | | |
|---|---|---|
| EP | 0398147 A2 | 11/1990 |
| EP | 0644173 A1 | 3/1995 |

(Continued)

OTHER PUBLICATIONS

Saunders and Frisch, "Polyurethanes Chemistry and Technology," vols. I and II, John Wiley and Sons, New York, NY 1962. US (too voluminous).

(Continued)

*Primary Examiner* — Kara Boyle
(74) *Attorney, Agent, or Firm* — Colleen D. Szuch

(57) ABSTRACT

The present invention relates to poured-in place polyurethane foams and polyol premixes comprising 1-chloro-3,3,3-trifluoropropene (HFCO-1233zd) and one or more additional co-blowing agents.

9 Claims, 6 Drawing Sheets

Initial Thermal Conductivity of Foams

(56) References Cited

U.S. PATENT DOCUMENTS

| | | | |
|---|---|---|---|
| 2,889,379 | A | 6/1959 | Ruh et al. |
| 2,917,480 | A | 12/1959 | Bailey et al. |
| 2,931,840 | A | 4/1960 | Maley |
| 2,996,555 | A | 8/1961 | Rausch et al. |
| 3,001,973 | A | 9/1961 | Piepenbrink et al. |
| 3,085,918 | A | 4/1963 | Sherliker et al. |
| 3,124,605 | A | 3/1964 | Wagner |
| 3,201,372 | A | 8/1965 | Wagner |
| 3,277,138 | A | 10/1966 | Holtschmidt et al. |
| 3,394,164 | A | 7/1968 | McClellan et al. |
| 3,401,190 | A | 9/1968 | Schmitt et al. |
| 3,454,606 | A | 7/1969 | Brotherton et al. |
| 3,492,330 | A | 1/1970 | Trecker et al. |
| 3,723,318 | A | 3/1973 | Butler |
| 3,884,828 | A | 5/1975 | Butler |
| 4,147,847 | A | 4/1979 | Schweiger |
| 4,465,786 | A | 8/1984 | Zimmer et al. |
| 4,487,816 | A | 12/1984 | Smith |
| 4,788,352 | A | 11/1988 | Smutny |
| 4,798,818 | A | 1/1989 | Baizer et al. |
| 4,868,224 | A | 9/1989 | Harasin et al. |
| 4,944,890 | A | 7/1990 | Deeb et al. |
| 4,945,119 | A | 7/1990 | Smits et al. |
| 5,137,932 | A | 8/1992 | Behme et al. |
| 5,250,208 | A | 10/1993 | Merchant et al. |
| 5,300,531 | A | 4/1994 | Weaver |
| 5,532,419 | A | 7/1996 | Van Der Puy et al. |
| 5,574,192 | A | 11/1996 | VanDerPuy et al. |
| 5,578,137 | A | 11/1996 | Shealy |
| 5,616,275 | A | 4/1997 | Chisolm et al. |
| 5,674,451 | A | 10/1997 | Nimitz et al. |
| 5,679,875 | A | 10/1997 | Aoyama et al. |
| 5,714,083 | A | 2/1998 | Turner |
| 5,736,063 | A | 4/1998 | Richard et al. |
| 5,744,052 | A | 4/1998 | Bivens |
| 5,762,822 | A | 6/1998 | Tucker |
| 5,788,886 | A | 8/1998 | Minor et al. |
| 5,900,185 | A | 5/1999 | Tapscott |
| 6,041,621 | A | 3/2000 | Olszewski et al. |
| 6,076,372 | A | 6/2000 | Acharya et al. |
| 6,111,150 | A | 8/2000 | Sakyu et al. |
| 6,124,510 | A | 9/2000 | Elsheikh et al. |
| 6,258,292 | B1 | 7/2001 | Turner |
| 6,274,779 | B1 | 8/2001 | Merkel et al. |
| 6,300,378 | B1 | 10/2001 | Tapscott |
| 6,327,866 | B1 | 12/2001 | Novak et al. |
| 6,395,796 | B1 | 5/2002 | Ghobary et al. |
| 6,403,847 | B1 | 6/2002 | Nakada et al. |
| 6,516,837 | B2 | 2/2003 | Thomas et al. |
| 6,844,475 | B1 | 1/2005 | Tung et al. |
| 6,858,571 | B2 | 2/2005 | Pham et al. |
| 6,972,271 | B2 | 12/2005 | Thomas et al. |
| 7,189,884 | B2 | 3/2007 | Mukhopadhyay et al. |
| 7,230,146 | B2 | 6/2007 | Merkel et al. |
| 7,279,451 | B2 | 10/2007 | Singh et al. |
| 2003/0127115 | A1 | 7/2003 | Thomas et al. |
| 2004/0256594 | A1* | 12/2004 | Singh et al. ............... 252/71 |
| 2005/0054741 | A1 | 3/2005 | Zipfel et al. |
| 2005/0233934 | A1 | 10/2005 | Singh et al. |
| 2006/0014843 | A1* | 1/2006 | Tanaka et al. ............... 521/99 |
| 2006/0022166 | A1 | 2/2006 | Wilson et al. |
| 2006/0043331 | A1 | 3/2006 | Shankland et al. |
| 2006/0142173 | A1 | 6/2006 | Johnson et al. |
| 2006/0243944 | A1 | 11/2006 | Minor et al. |
| 2007/0007488 | A1 | 1/2007 | Singh et al. |
| 2007/0100009 | A1 | 5/2007 | Creazzo et al. |
| 2009/0099272 | A1 | 4/2009 | Williams et al. |
| 2009/0099274 | A1 | 4/2009 | Van Der Puy et al. |
| 2009/0253820 | A1 | 10/2009 | Bowman et al. |
| 2009/0325445 | A1 | 12/2009 | Bogdan et al. |
| 2011/0037016 | A1 | 2/2011 | Singh et al. |

FOREIGN PATENT DOCUMENTS

| | | |
|---|---|---|
| EP | 0974571 A2 | 1/2000 |
| EP | 1055439 A2 | 11/2000 |
| EP | 1191080 A2 | 3/2002 |
| GB | 950 876 A | 2/1964 |
| JP | 04-110388 A | 2/1964 |
| KR | 102008003292 A | 4/2008 |
| WO | 00/24815 A1 | 5/2000 |
| WO | 03064508 A2 | 8/2003 |
| WO | 2004/037752 A2 | 5/2004 |
| WO | 2004037913 A2 | 5/2004 |
| WO | 2005/103187 A1 | 11/2005 |
| WO | 2005/103188 A1 | 11/2005 |
| WO | 2005105947 A2 | 11/2005 |
| WO | 2007002703 A2 | 1/2007 |
| WO | 2009048802 A2 | 4/2009 |
| WO | 2009048807 A2 | 4/2009 |
| WO | 2009048826 A2 | 4/2009 |

OTHER PUBLICATIONS

Gum, Reese, Ulrich, Reaction Polymers, Oxford University Press, publishers, New York, NY (1992) US (Too voluminous).

Klempner and Sendijarevic, Polymeric Foams and Foam Technology, Hanser Gardner Publications, Cincinnati, OH (2004) US (Too voluminous).

Ralph C. Downing., "Fluorcarbon Refrigerants Handbook," Prentice Hall, Chapter 3 (1988), pp. 17 to 34. (US).

Perry Romanowski, "Polyurethane," Gale Edit—How Plastics are Made—Volumes-Polyurethane, http://www.gale-edit.com/products/volumes/polyurethane.htm (Jan. 2, 20067) US.

Saunders and Frisch, "Polyurethanes Chemistry & Technology," vol. XVI, Part I and Part II Technology, John Wiley and Sons, New York, NY (1962), pp. 193 to 201 and 219 to 223. US.

Jan H. Schutt, "Polyurethane Foam Industry Prepares for 'Zero ODP'," Plastics Technology—Online article (http://www/plasticstechnology.com/articles/19911 fa3.html) (Jan. 2, 2006) US.

M. Bogdan, J. Ling, D. Williams, "Next Generation (LGWP) of Blowing Agent for Spray Foam Applications" Proceedings of Center for the Polyurethanes Industry (CPI) (2009) US.

J. Ling, D. Williams, "Evaluation of HBA-2, a Low GWP Blowing Agent, in Pour-in-place Panel Applications" Proceedings of Center for the Polyurethanes Industry (CPI) (2010) US.

* cited by examiner

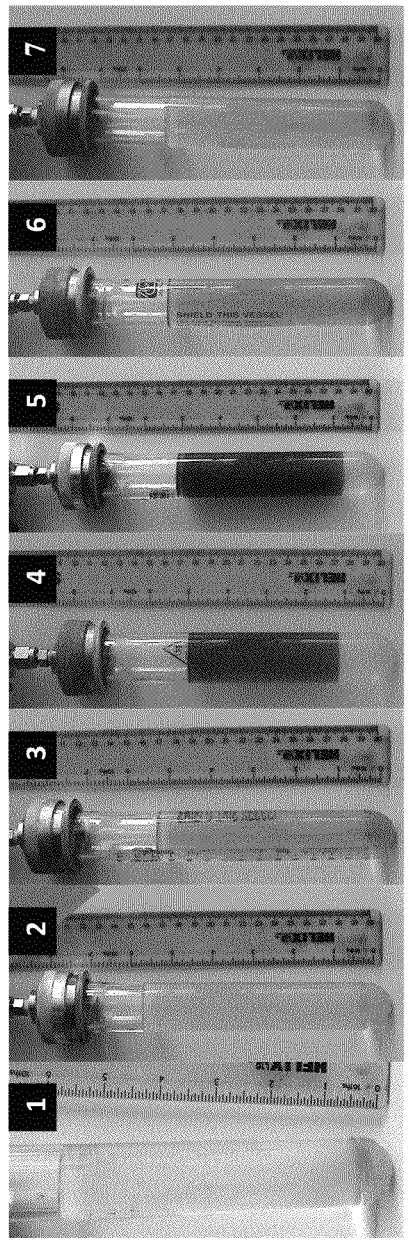
FIG. 1 – Polyols with HFC-245fa

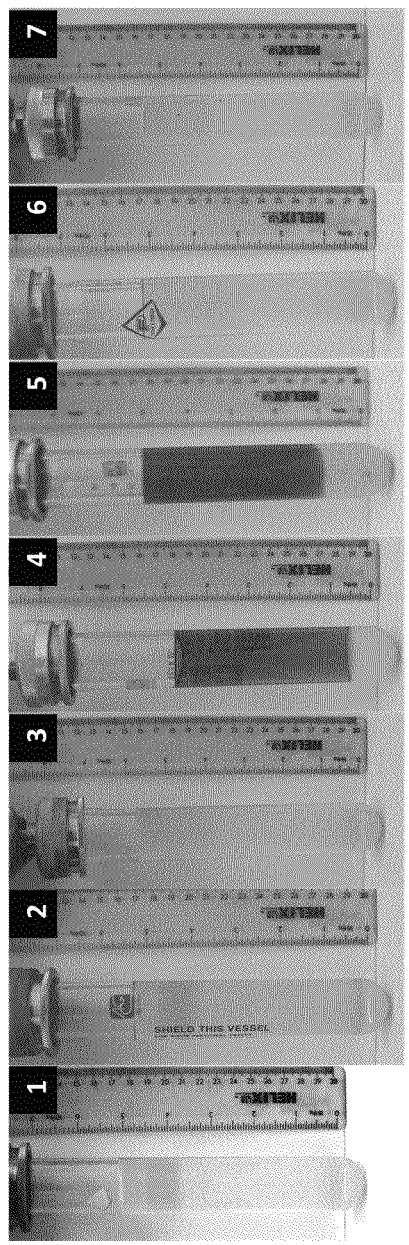
FIG. 2 - Polyols with HFCO-1233ZD

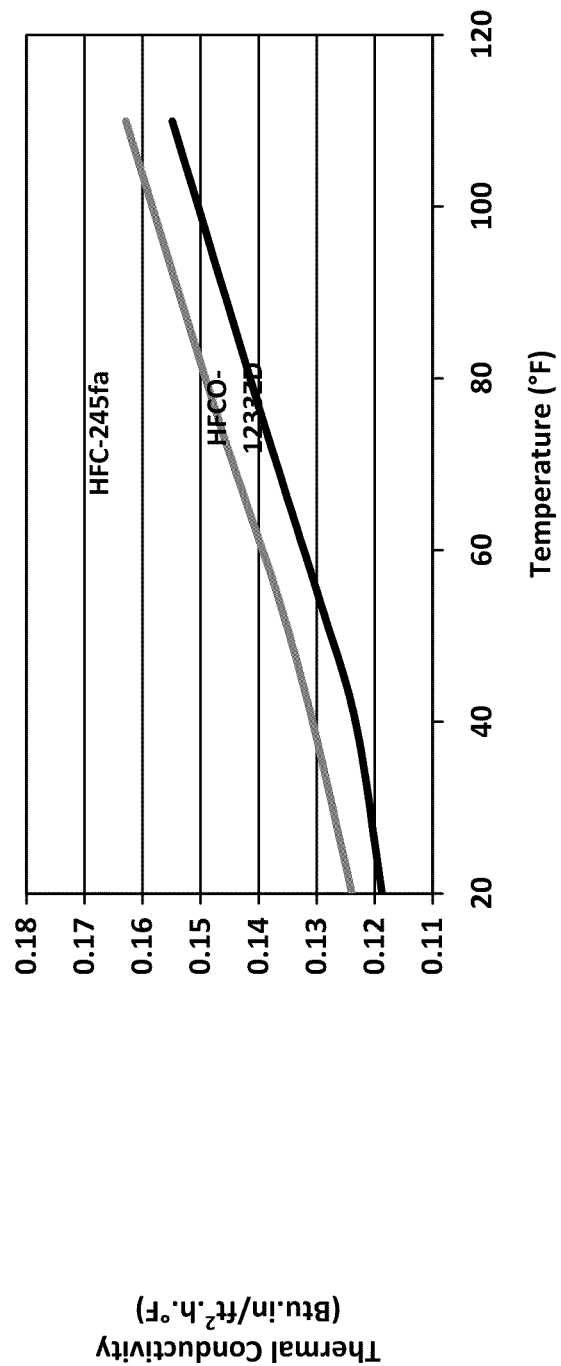
FIG. 3 - Initial Thermal Conductivity of Foams

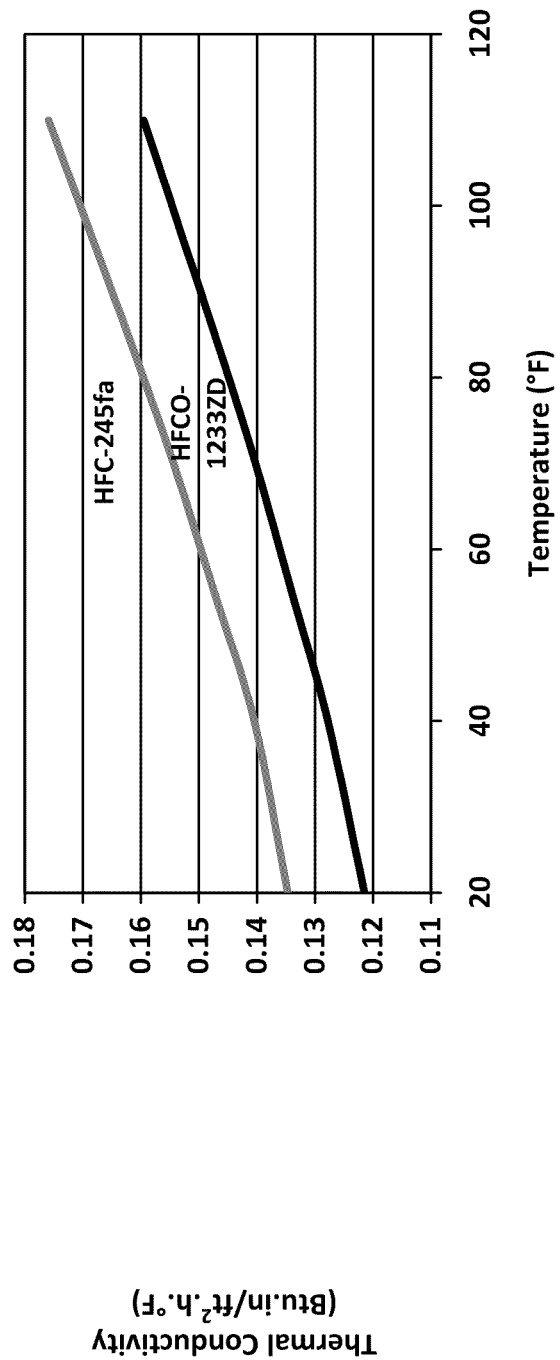
FIG. 4 - Thermal Conductivity of Foams after 28 Days Aging at Ambient Temperature

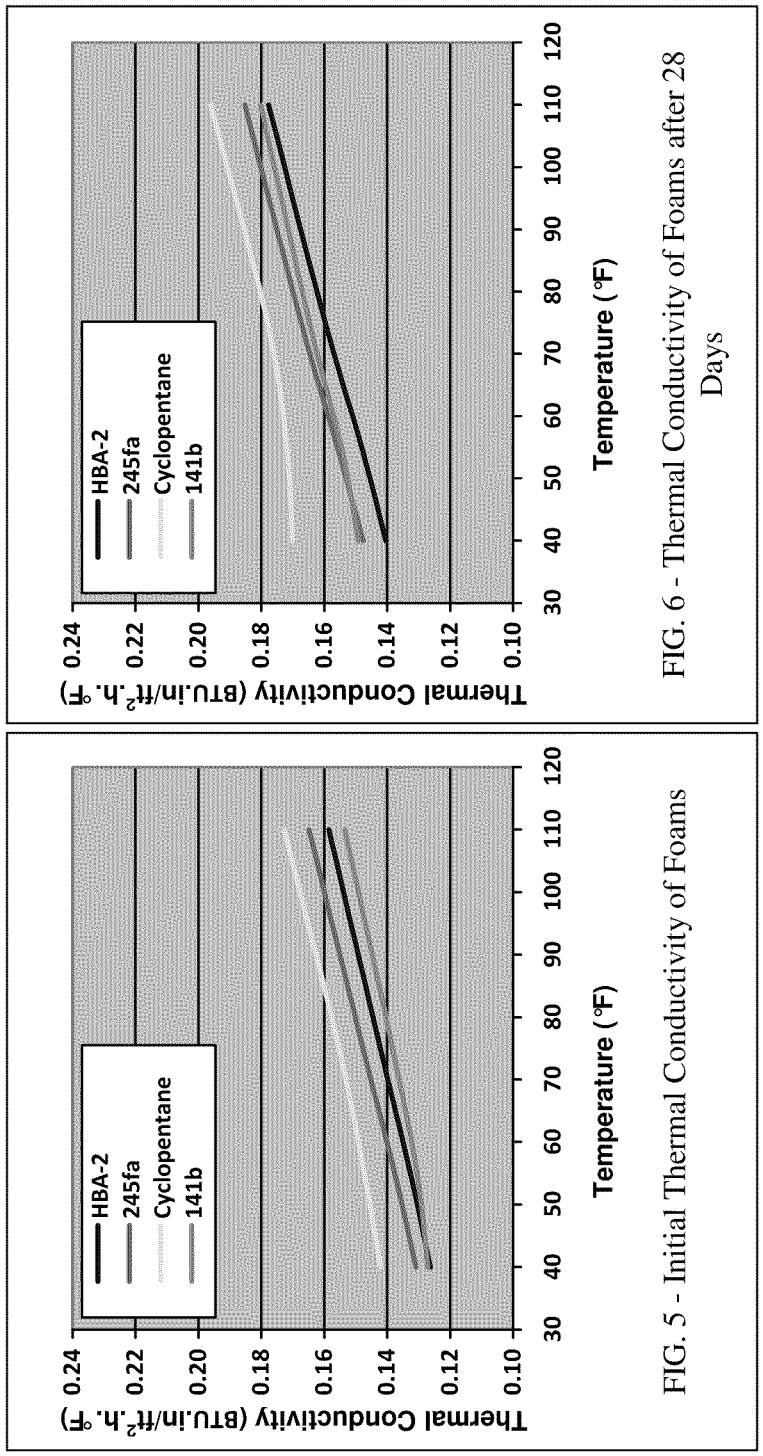
FIG. 5 - Initial Thermal Conductivity of Foams
FIG. 6 - Thermal Conductivity of Foams after 28 Days

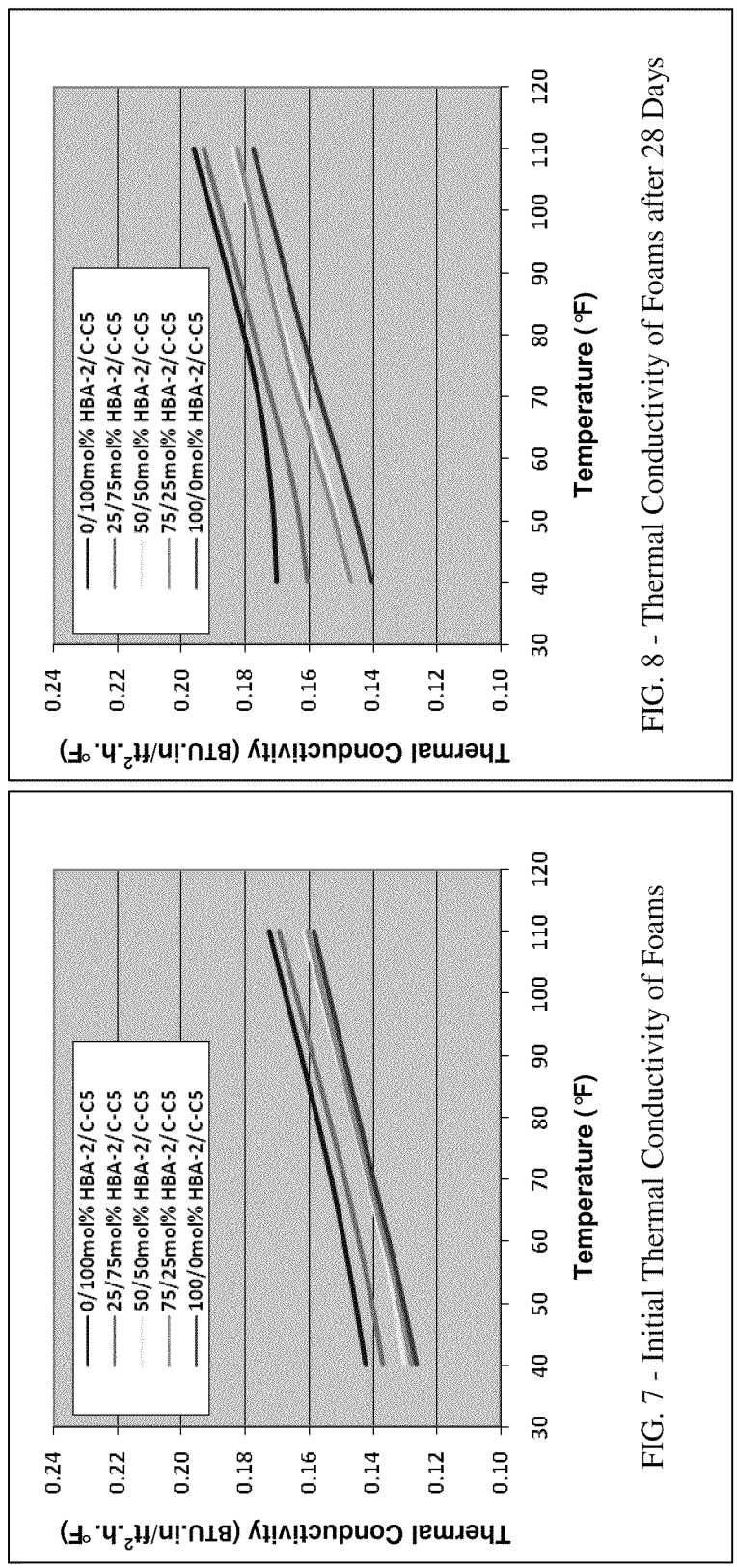
FIG. 8 - Thermal Conductivity of Foams after 28 Days
FIG. 7 - Initial Thermal Conductivity of Foams though the k-factor decreases, this is an indication that the material is more resistant to heat transfer and therefore a better foam for insulation purposes. Thus, materials that produce lower k-factor foams are generally desirable and advantageous.

In addition to the important performance characteristics mentioned above, it has become increasingly important for the blowing agent(s) used in foamable compositions to have low global warming potential.

FOAMS AND ARTICLES MADE FROM FOAMS CONTAINING 1-CHLORO-3,3,3-TRIFLUOROPROPENE (HFCO-1233ZD)

CROSS REFERENCE TO RELATED APPLICATION

This application claims the benefit of U.S. Provisional patent application Ser. No. 61/368,246 filed Jul. 27, 2010, and U.S. Provisional patent application Ser. No. 61/509,045, filed Jul. 18, 2011, the contents each of which are incorporated herein by reference in their entirety.

This application is also a continuation-in-part of U.S. patent application Ser. No. 12/847,381, filed on Jul. 30, 2010, which claims the benefit of U.S. Provisional patent application Ser. No. 61/232,836, filed Aug. 11, 2009, the contents each of which are incorporated herein by reference in their entirety.

This application is also a continuation-in-part of U.S. patent application Ser. No. 12/276,137, filed Nov. 21, 2008, which claims priority to U.S. Provisional patent application No. 60/989,977 filed Nov. 25, 2007, and also is a continuation of PCT patent application number PCT/US07/64570 filed Mar. 21, 2007 and which is a continuation of U.S. patent application Ser. No. 11/474,887 filed Jun. 26, 2006 and which claims priority to U.S. Provisional patent application Ser. No. 60/784,731 filed Mar. 21, 2006, each of which is incorporated herein by reference in their entirety.

FIELD OF THE INVENTION

The present invention pertains to foams and to particular articles made form foams and methods for the preparation thereof, and in particular to polyurethane and polyisocyanurate foams and methods for the preparation thereof.

BACKGROUND OF THE INVENTION

The class of foams known as low density, rigid to semi-rigid polyurethane or polyisocyanurate foams has utility in a wide variety of insulation applications, including roofing systems, building panels, building envelope insulation, spray applied foams, one and two component froth foams, insulation for refrigerators and freezers, and so called integral skin foam for cushioning and safety application such as steering wheels and other automotive or aerospace cabin parts, shoe soles, and amusement park restraints. An important factor in the large-scale commercial success of many rigid to semi-rigid polyurethane foams has been the ability of such foams to provide a good balance of properties. In general, rigid polyurethane and polyisocyanurate foams should provide outstanding thermal insulation, excellent fire resistance properties, and superior structural properties at reasonably low densities.

As is known, blowing agents are used to form the cellular structure required for such foams. It has been common to use liquid fluorocarbon blowing agents because of their ease of use, among other factors. Fluorocarbons not only act as blowing agents by virtue of their volatility, but also are encapsulated or entrained in the closed cell structure of the rigid foam and are generally the major contributor to the thermal conductivity properties of the rigid urethane foam. After the foam is formed, the k-factor associated with the foam produced provides a measure of the ability of the foam to resist the transfer of heat through the foam material. As the k-factor decreases, this is an indication that the material is more resis-

SUMMARY OF THE INVENTION

The present invention relates to the surprising and unexpected improved properties in rigid pour-in place polyurethane foam applications using HFCO-1233zd (preferably the trans form thereof, HFCO-1233zd(E)) as the blowing agent. To this end, and in one aspect, the invention relates to a poured-in place polyurethane foam comprising: a polymeric foam structure including a plurality of closed cells therein; and trans-1-chloro-3,3,3-trifluoropropene (HFCO-1233zd (E)) contained in at least a portion of said cells. Within the polymeric foam structure a majority of the cells contain a gas comprising said HFCO-1233zd(E). In certain aspects, the gas is provided as at least 50% by volume of said HFCO-1233zd (E). In further aspects, the gas within the cells consists essentially of HFCO-1233zd(E).

In alternative aspects of the foregoing, the gas provided within the cell is provided as 1233zd (preferably 1233zd(E)) and at least one additional agent, which may be selected from any one or combination of water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2 dichloroethylene; methylal, methyl formate; 1-chloro-1,2,2,2-tetrafluoroethane (HCFC-124); 1,1-dichloro-1-fluoroethane (HCFC-141b); 1,1,1,2-tetrafluoroethane (HFC-134a); 1,1,2,2-tetrafluoroethane (HFC-134); 1-chloro 1,1-difluoroethane (HCFC-142b); 1,1,1,3,3-pentafluorobutane (HFC-365mfc); 1,1,1,2,3,3,3-heptafluoropropane (HFC-227ea); trichlorofluoromethane (CFC-11); dichlorodifluoromethane (CFC-12); dichlorofluoromethane (HCFC-22); 1,1,1,3,3,3-hexafluoropropane (HFC-236fa); 1,1,1,2,3,3-hexafluoropropane (HFC-236e); 1,1,1,2,3,3,3-heptafluoropropane (HFC-227ea), difluoromethane (HFC-32); 1,1-difluoroethane (HFC-152a); 1,1,1,3,3-pentafluoropropane (HFC-245fa); 1,3,3,3-tetrafluoropropene (HFO-1234ze); 1,1,1,4,4,4-hexafluorobut-2-ene (HFO-1336mzzm); butane; isobutane; normal pentane; isopentane; or cyclopentane. In certain aspects, the additional agent is cyclopentane. In such embodiments, the gas component is comprised of from about 5 wt. % to about 99 wt. % of HFCO-1233zd(E) and from about 95 wt. % to about 1 wt. % of cyclopentane; from about 25 wt. % to about 90 wt. % of HFCO-1233zd(E) and from about 75 wt. % to about 10 wt. % of cyclopentane; or from about 50 wt. % to about 85 wt. % of HFCO-1233zd(E) and from about 50 wt. % to about 15 wt. % of cyclopentane.

In further aspects the poured-in place polyurethane foam having 1233zd(E) as the gas component has a free rise density of 1.87 lb/ft³ and/or a core density of 2.21 lb/ft³. In even further aspects, the poured-in place polyurethane foam having 1233zd(E) and cyclopentane as the gas component has a free rise density of greater than 1.71 lb/ft³ and/or a core density of greater than 2.33 lb/ft³.

In alternative embodiments, the present invention relates to a pour-in place foam premix comprising a polyol; a blowing agent comprising trans-1-chloro-3,3,3-trifluoropropene (HFCO-1233zd(E)); at least one surfactant; and at least one catalyst. In certain aspects, the pour-in place foam premix has a foam reactivity gel time of about 55 seconds and/or a foam reactivity tack free time of about 100 seconds.

The blowing agent may further include one or more additional blowing agents, which may be selected from any one or combination of water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2 dichloroethylene; methylal, methyl formate; 1-chloro-1,2,2,2-tetrafluoroethane (HCFC-124); 1,1-dichloro-1-fluoroethane (HCFC-141b); 1,1,1,2-tetrafluoroethane (HFC-134a); 1,1,2,2-tetrafluoroethane (HFC-134); 1-chloro 1,1-difluoroethane (HCFC-142b); 1,1,1,3,3-pentafluorobutane (HFC-365mfc); 1,1,1,2,3,3,3-heptafluoropropane (HFC-227ea); trichlorofluoromethane (CFC-11); dichlorodifluoromethane (CFC-12); dichlorofluoromethane (HCFC-22); 1,1,1,3,3,3-hexafluoropropane (HFC-236fa); 1,1,1,2,3,3-hexafluoropropane (HFC-236e); 1,1,1,2,3,3,3-heptafluoropropane (HFC-227ea); difluoromethane (HFC-32); 1,1-difluoroethane (HFC-152a); 1,1,1,3,3-pentafluoropropane (HFC-245fa); 1,3,3,3-tetrafluoropropene (HFO-1234ze); 1,1,1,4,4,4-hexafluorobut-2-ene (HFO-1336mzzm); butane; isobutane; normal pentane; isopentane; or cyclopentane. By way of a non-limiting example, in one embodiment, the additional blowing agent is cyclopentane and the resulting premix has a foam reactivity gel time from 52 to 55 seconds and/or a foam reactivity tack free time from 85 to 100 seconds.

BRIEF DESCRIPTION OF THE FIGURES

FIG. 1 shows the appearance of various polyol mixtures with HFC-245fa after having been aged at room temperature for 24 hours. From left to right, the polyols shown include: (1) Voranol 270, (2) Voranol 490, (3) Voranol 800, (4) Terate 4020, (5) Terate 2031, (6) Carpol GSP-280, (7) Multranol 3901.

FIG. 2 shows the appearance of various polyol mixtures with HFCO-1233zd after having been aged at room temperature for 24 hours. From left to right, the polyols shown include: (1) Voranol 270, (2) Voranol 490, (3) Voranol 800, (4) Terate 4020, (5) Terate 2031, (6) Carpol GSP-280, (7) Multranol 3901.

FIG. 3 shows the comparative initial thermal conductivity of foams having HFC-245fa or HFCO-1233zd as blowing agents.

FIG. 4 shows the comparative thermal conductivity of foams having HFC-245fa or HFCO-1233zd as blowing agents after 28 Days Aging at Ambient Temperature.

FIG. 5 shows the comparative initial thermal conductivity of foams having HFC-245fa, HFCO-1233zd (or HBA-2), cyclopentane, or HCFC-141b as blowing agents.

FIG. 6 shows the comparative thermal conductivity of foams having HFC-245fa, HFCO-1233zd (or HBA-2), cyclopentane, or HCFC-141b as blowing agents after 28 Days Aging at Ambient Temperature.

FIG. 7 shows the comparative initial thermal conductivity of foams having varying component amounts of HFCO-1233zd (or HBA-2) and cyclopentane as blowing agent blends.

FIG. 8 shows the comparative thermal conductivity of foams having varying component amounts of HFCO-1233zd (or HBA-2) and cyclopentane as blowing agent blends, after 28 Days Aging at Ambient Temperature.

DESCRIPTION OF PREFERRED EMBODIMENTS

Applicants have come to recognize the existence of an unexpected and surprising advantage when a certain hydrofluoroolefin, namely HFCO-1233zd (preferably the trans form thereof, HFCO-1233zd(E)), is used as the blowing agent in rigid polyurethane foam applications. One advantage of the foams and the articles in accordance with certain preferred embodiments is that the foams and articles are capable of maintaining superior thermal properties, including k-values, over an period of time that is unexpectedly and surprisingly long. As those skilled in the art will appreciate, this property provides a desirable commercial advantage and value. Another advantage of the foams and articles according to certain preferred embodiments of the present invention is that the foams and the articles formed therefrom have strength advantages, including a desirable ratio of the strength of the foam measured in the parallel direction to the strength of the foam in the perpendicular direction.

Although applicants do not intend to be bound by or to any particular theory of operation, it is believed that the exceptional physical and thermodynamic properties exhibited by the foams and articles of the present invention results, at least potentially in part, from the type and nature of the cellular structure formed using the blowing agents of the present invention when used in combination with foldable compositions comprising polyurethane adapted to the formation of rigid polyurethane panels, and even more preferably poured in place a polyurethane panels.

As is known by those skilled in the art, polyurethane foam is used extensively as the core insulation material in several types of articles, including metal panels in many applications, including the walk-in cooler and freezer sectors. These foam core metal panels can be manufactured by either continuous or discontinuous production methods and both of such methods are adaptable for use within the scope of the present invention. In the construction industry, such articles in the form of rigid panels are employed as insulation in the building envelope of commercial structures. In developed countries, the most commonly used blowing agents for polyurethane foam in this application have prior to this invention included HFC-245fa, HFC-134a and hydrocarbons. HCFC-141b is commonly used as the blowing agent in the majority of the polyurethane foam markets in developing countries. As the low global warming potential initiative emerges in developed countries and the HCFC phase-out in developing countries approaches, there is an increasing worldwide need and desire for low global warming potential (LGWP) blowing agents.

Applicants expect that one advantage of the present invention is that the amount of HFCO-1233ZD, on a weight basis, need to for a particular rigid polyurethane foam formulation will be less than that for other currently used blowing agents, such as HFC-245fa. Applicants also expect that the loss of blowing agent of the present invention from the polyol system, in particular during blending and during shipping in drums, should be decreased because applicants have recognized that the vapor pressure of HFCO-1233ZD is lower than that of HFC-245fa.

TABLE 1

Physical Properties of Blowing Agents

| | Physical Properties | | | |
|---|---|---|---|---|
| | HFCO-1233ZD | HFC-245fa | Cyclopentane | HCFC-141b |
| | | Formula | | |
| | — | CF3CH2CF2H | C5H10 | CH3CCl2F |
| Boiling Point, °C./° F. | >HFC-245fa | 15.3/59.5 | 49.3/120.7 | 32.2/90.0 |

TABLE 1-continued

Physical Properties of Blowing Agents

| | Physical Properties | | | |
|---|---|---|---|---|
| | HFCO-1233ZD | HFC-245fa | Cyclopentane | HCFC-141b |
| Formula | — | CF3CH2CF2H | C5H10 | CH3CCl2F |
| Liquid Density, g/cc @ 20° C./68° F. | <HCFC-141b 1.30 | 1.32 | 0.74 | 1.24 |
| Vapor Pressure, kPa @ 20° C./68° F. | 106.3 | 122.0 | 34.0 | 69.0 |
| Vapor Thermal Conductivity, mW/mK @ 10° C. 1/50° F. | 12.5[1] | 12.5[2] | 11 | 8.8 |

[1]Honeywell measured value
[2]Property was measured at 24° C.

HFCO-1233ZD is a liquid blowing agent with low global warming potential. Table 2 summarizes the environmental properties of HFCO-1233ZD compared to other commonly used blowing agents. Compared to HFC-245fa and HCFC-141b, HFCO-1233ZD has a significantly lower global warming potential. Furthermore, applicants test work indicates that HFCO-1233ZD will not be considered a volatile organic compound (VOC) in the US and subject to emission controls.

TABLE 2

Environmental Properties of Blowing Agents

| Environmental Properties | HFCO-1233ZD | HFC-245fa | Cyclopentane | HCFC-141b |
|---|---|---|---|---|
| GWP (100 yr horizon, $CO_2$ = 1)[1] | 7 | 1030 | 11 | 725 |
| Atmospheric Lifetime | 28 days | 8.4 yrs | Few Days | 9.4 yrs |
| VOC status | No[2] | No | Yes | No |

[1]HFC-245fa and HCFC-141b data were obtained from IPCC report "Climate Change 2007 - The Physical Science Basis". Cyclopentane data is a generally accepted value.
[2]Honeywell data shown that HFCO-1233ZD is not a VOC, pending EPA approval Another advantage of the present invention is that HFCO-1233ZD is classified as a non-flammable liquid blowing agent with neither a flash point nor vapor flame limits in air. Table 3 summarizes the flammability properties of different blowing agents. HCFC-141b is classified as combustible with vapor flame limits but no flash point while hydrocarbons, such as cyclopentane, exhibit flash points and are therefore flammable. The use of flammable materials will generally require major capital investment in storage and processing equipment modifications.

TABLE 3

Flammability Properties of Blowing Agents

| Flammability Properties | HFCO-1233ZD | HFC-245fa | Cyclopentane | HCFC-141b |
|---|---|---|---|---|
| Vapor Flame Limits in Air | | | | |
| Upper, Vol % | None | None | 7.6 | 1.5 |
| Lower, Vol % | None | None | 17.7 | 8.7 |
| Flashpoint, ° C./° F. | None | None | −37.0/−34.6 | None |

Furthermore, applicants recognize that toxicity assessments of new blowing agent molecules are vital before commercialization. The toxicity information directly affects the exposure guidelines during the foam manufacturing process. Furthermore, the information is critical to considerations in product stewardship and responsible care. Applicants have found that HFCO-1233ZD has a very low order of acute toxicity which is either equivalent to or better than that of HFC-245fa.

The use of HFCO-1233zd may be provided as a blowing agent in a polyol premix, particularly premixes useful as a pour-in-place foam, and/or the primary gas component of the resulting foam cell structure. HFCO-1233zd may be provided alone or as a blend with one or more additional blowing agents. A nonexclusive list of such co-blowing agents include, but are not limited to, water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2 dichloroethylene; methylal, methyl formate; 1-chloro-1,2,2,2-tetrafluoroethane (HCFC-124); 1,1-dichloro-1-fluoroethane (HCFC-141b); 1,1,1,2-tetrafluoroethane (HFC-134a); 1,1,2,2-tetrafluoroethane (HFC-134); 1-chloro 1,1-difluoroethane (HCFC-142b); 1,1,1,3,3-pentafluorobutane (HFC-365mfc); 1,1,1,2,3,3,3-heptafluoropropane (HFC-227ea); trichlorofluoromethane (CFC-11); dichlorodifluoromethane (CFC-12); dichlorofluoromethane (HCFC-22); 1,1,1,3,3,3-hexafluoropropane (HFC-236fa); 1,1,1,2,3,3-hexafluoropropane (HFC-236e); 1,1,1,2,3,3,3-heptafluoropropane (HFC-227ea), difluoromethane (HFC-32); 1,1-difluoroethane (HFC-152a); 1,1,1,3,3-pentafluoropropane (HFC-245fa); 1,3,3,3-tetrafluoropropene (HFO-1234ze—including its trans or "E" isomer); 1,1,1,4,4,4-hexafluorobut-2-ene (HFO-1336mzzm—including its cis or "Z" isomer); butane; isobutane; normal pentane; isopentane; cyclopentane, or combinations thereof. In certain aspects, particularly in the pour-in-place context, the co-blowing agent is a cyclopentane The blowing agent component is usually present in the polyol premix composition in an amount of from about 1 wt. % to about 30 wt. %, preferably from about 3 wt. % to about 25 wt. %, and more preferably from about 5 wt. % to about 25 wt. %, by weight of the polyol premix composition. When both 1233zd and one or more additional blowing agents are present, 1233zd may be present in the blowing agent component in an amount of from about 5 wt. % to about 99 wt. %, from about 10 wt. % to about 90 wt. %, or from about 25 wt. % to about 85 wt. %, by weight of the blowing agent component; and the optional blowing agent is usually present in the blowing agent component in an amount of from about 95 wt. % to about 1 wt. %, from about 90 wt. % to about 10 wt. %, or from about 15 wt. % to about 75 wt. %, by weight of the blowing agent component. When 1233zd is provided in a blend with cyclopentane, 1233zd may be present in the blowing agent component in an amount of from about 5 wt. % to about 99 wt. %, from about 25 wt. % to about 90 wt. %, or from about 50 wt. % to about 85 wt. %, by weight of the blowing agent component; and cyclopentane is usually present in the blowing agent component in an amount of from about 95 wt. % to about 1 wt. %, from about 75 wt. % to about 10 wt. %, or from about 50 wt. % to about 15 wt. %, by weight of the blowing agent component.

The polyol component, which may include mixtures of polyols, can be any polyol which reacts in a known fashion with an isocyanate in preparing a polyurethane or polyisocyanurate foam. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; glycerol; ethylene glycol; diethylene glycol; propylene glycol; graft copolymers of polyether polyols with a vinyl polymer; a copolymer of a polyether polyol with a polyurea; one or more of (a) condensed with one or more of (b): (a) glycerine, ethylene glycol, diethylene glycol, trimethylolpropane, ethylene diamine, pentaerythritol, soy oil, lecithin, tall oil, palm oil, castor oil; (b) ethylene oxide, propylene oxide, a mixture of ethylene oxide and propylene oxide; or combinations thereof. The polyol component is preferably present in the polyol premix composition in an amount of from about 60 wt. % to about 95 wt. %, preferably from about 65 wt. % to about 95 wt. %, and more preferably from about 70 wt. % to about 90 wt. %, by weight of the polyol premix composition.

In certain embodiments, the polyol premix composition may also contain at least one silicone-containing surfactant. The silicone-containing surfactant is used to aid in the formation of foam from the mixture, as well as to control the size of the bubbles of the foam so that a foam of a desired cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise.

Silicone surfactants for use in the preparation of polyurethane or polyisocyanurate foams are available under a number of trade names known to those skilled in this art. Such materials have been found to be applicable over a wide range of formulations allowing uniform cell formation and maximum gas entrapment to achieve very low density foam structures. The preferred silicone surfactant comprises a polysiloxane polyoxyalkylene block co-polymer. Some representative silicone surfactants useful for this invention are Momentive's L-5130, L-5180, L-5340, L-5440, L-6100, L-6900, L-6980 and L-6988; Air Products DC-193, DC-197, DC-5582, and DC-5598; and B-8404, B-8407, B-8409 and B-8462 from Goldschmidt AG of Essen, Germany. Others are disclosed in U.S. Pat. Nos. 2,834,748; 2,917,480; 2,846,458 and 4,147,847. The silicone surfactant component is usually present in the polyol premix composition in an amount of from about 0.5 wt. % to about 5.0 wt. %, preferably from about 1.0 wt. % to about 4.0 wt. %, and more preferably from about 1.5 wt. % to about 3.0 wt. %, by weight of the polyol premix composition.

The polyol premix composition may optionally contain a non-silicone surfactant, such as a non-silicone, non-ionic surfactant. Such may include oxyethylated alkylphenols, oxyethylated fatty alcohols, paraffin oils, castor oil esters, ricinoleic acid esters, turkey red oil, groundnut oil, paraffins, and fatty alcohols. A preferred non-silicone non-ionic surfactant is LK-443 which is commercially available from Air Products Corporation. When a non-silicone, non-ionic surfactant used, it is usually present in the polyol premix composition in an amount of from about 0.25 wt. % to about 3.0 wt. %, preferably from about 0.5 wt. % to about 2.5 wt. %, and more preferably from about 0.75 wt. % to about 2.0 wt. %, by weight of the polyol premix composition.

The polyol premix composition may also include one or more catalysts, in particular amine catalysts, such as, but not limited to, primary amine, secondary amine or tertiary amine. Useful tertiary amine catalysts non-exclusively include N,N,N',N'',N''-pentamethyldiethyltriamine, N,N-dicyclohexylmethylamine; N,N-ethyldiisopropylamine; N,N-dimethylcyclohexylamine; N,N-dimethylisopropylamine; N-methyl-N-isopropylbenzylamine; N-methyl-N-cyclopentylbenzylamine; N-isopropyl-N-sec-butyl-trifluoroethylamine; N,N-diethyl-($\alpha$-phenylethyl)amine, N,N,N-tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-$\alpha$-trifluoromethylethyl)amine; di-($\alpha$-phenylethyl)amine; or combinations thereof.

Useful primary amine catalysts non-exclusively include: triphenylmethylamine and 1,1-diethyl-n-propylamine.

Other useful amines includes morpholines, imidazoles, ether containing compounds, and the like. These include
dimorpholinodiethylether
N-ethylmorpholine
N-methylmorpholine
bis(dimethylaminoethyl)ether
imidizole
n-methylimidazole
1,2-dimethylimidazole
dimorpholinodimethylether
N,N,N,N'',N''-pentamethyldiethylenetriamine
N,N,N,N'',N''-pentaethyldiethylenetriamine
N,N,N,N'',N''-pentamethyldipropylenetriamine
bis(diethylaminoethyl)ether
bis(dimethylaminopropyl)ether.

The preparation of polyurethane or polyisocyanurate foams using the compositions described herein may follow any of the methods well known in the art can be employed, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio. In general, polyurethane or polyisocyanurate foams are prepared by combining an isocyanate, the polyol premix composition, and other materials such as optional flame retardants, colorants, or other additives. These foams can be rigid, flexible, or semi-rigid, and can have a closed cell structure, an open cell structure or a mixture of open and closed cells.

It is convenient in many applications to provide the components for polyurethane or polyisocyanurate foams in pre-blended formulations. Most typically, the foam formulation is pre-blended into two components. The isocyanate and optionally other isocyanate compatible raw materials, including but not limited to blowing agents and certain silicone surfactants, comprise the first component, commonly referred to as the "A" component. The polyol mixture composition, including surfactant, catalysts, blowing agents, and optional other ingredients comprise the second component, commonly referred to as the "B" component. In any given application, the "B" component may not contain all the above listed components, for example some formulations omit the flame retardant if flame retardancy is not a required foam property. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a stream to the mix head or reaction site. Most conveniently, however, they are all, with the exception of water, incorporated into one B component as described above.

A foamable composition suitable for forming a polyurethane or polyisocyanurate foam may be formed by reacting an organic polyisocyanate and the polyol premix composition described above. Any organic polyisocyanate can be employed in polyurethane or polyisocyanurate foam synthesis inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry. These are described in, for example, U.S. Pat. Nos. 4,868,224; 3,401,190; 3,454,606; 3,277,138; 3,492,330; 3,001,973; 3,394,164; 3,124.605; and 3,201,372. Preferred as a class are the aromatic polyisocyanates.

Representative organic polyisocyanates correspond to the formula:

$$R(NCO)_z$$

wherein R is a polyvalent organic radical which is either aliphatic, aralkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5-'tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene disocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl)methene, bis(2-methyl-4-isocyanatophenyl)methane, and the like. Preferred polyisocyanates are the polymethylene polyphenyl isocyanates, Particularly the mixtures containing from about 30 to about 85 percent by weight of methylenebis(phenyl isocyanate) with the remainder of the mixture comprising the polymethylene polyphenyl polyisocyanates of functionality higher than 2. These polyisocyanates are prepared by conventional methods known in the art. In the present invention, the polyisocyanate and the polyol are employed in amounts which will yield an NCO/OH stoichiometric ratio in a range of from about 0.9 to about 5.0. In the present invention, the NCO/OH equivalent ratio is, preferably, about 1.0 or more and about 3.0 or less, with the ideal range being from about 1.1 to about 2.5. Especially suitable organic polyisocyanate include polymethylene polyphenyl isocyanate, methylenebis (phenyl isocyanate), toluene diisocyanates, or combinations thereof.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are potassium acetate, potassium octoate, and N-(2-hydroxy-5-nonylphenol)methyl-N-methylglycinate.

Conventional flame retardants can also be incorporated, preferably in amount of not more than about 20 percent by weight of the reactants. Optional flame retardants include tris(2-chloroethyl)phosphate, tris(2-chloropropyl)phosphate, tris(2,3-dibromopropyl)phosphate, tris(1,3-dichloropropyl)phosphate, tri(2-chloroisopropyl)phosphate, tricresyl phosphate, tri(2,2-dichloroisopropyl)phosphate, diethyl N,N-bis(2-hydroxyethyl)aminomethylphosphonate, dimethyl methylphosphonate, tri(2,3-dibromopropyl)phosphate, tri(1,3-dichloropropyl)phosphate, and tetra-kis-(2-chloroethyl)ethylene diphosphate, triethylphosphate, diammonium phosphate, various halogenated aromatic compounds, antimony oxide, aluminum trihydrate, polyvinyl chloride, melamine, and the like. Other optional ingredients can include from 0 to about 7 percent water, which chemically reacts with the isocyanate to produce carbon dioxide. This carbon dioxide acts as an auxiliary blowing agent. In the case of this invention, the water cannot be added to the polyol blend but, if used, can be added as a separate chemical stream. Formic acid is also used to produce carbon dioxide by reacting with the isocyanate and is optionally added to the "B" component.

In addition to the previously described ingredients, other ingredients such as, dyes, fillers, pigments and the like can be included in the preparation of the foams. Dispersing agents and cell stabilizers can be incorporated into the present blends. Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

The polyurethane or polyisocyanurate foams produced can vary in density from about 0.5 pounds per cubic foot to about 60 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture disclosed in this invention plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well known applications, including but not limited to thermal insulation, cushioning, flotation, packaging, adhesives, void filling, crafts and decorative, and shock absorption.

The following non-limiting examples serve to illustrate the invention.

EXAMPLES

Comparative Example 1

In the panel foam industry, it is often necessary to blend a blowing agent into the polyol premix in the manufacturing facility regardless of the production methods, either continuous or discontinuous. Adequate miscibility of blowing agent in polyol is necessary to produce polyurethane foam, and in particular rigid polyurethane foam panels, with desirable physical and thermal properties. The miscibility of HFCO-1233ZD was compared to HFC-245fa in various polyols commonly used in panel foam applications. Table 4 lists the name, type and suppliers of polyols evaluated in this miscibility study.

In this experiment, a mixture of 40 wt % blowing agent and 60 wt % polyol was prepared in a Fischer Porter tube. The tube was then vigorously shaken and thoroughly mixed. The appearance of the mixture was recorded after the tubes were conditioned at room temperature for 24 hours. If a phase separation was detected, the amount of blowing agent dissolved was indirectly calculated by measuring the height of the blowing agent phase which had settled at the bottom of the tube. Table 5 shows the miscibility of HFCO-1233ZD and HFC-245fa in the evaluated polyols correspondingly. Furthermore, FIG. 1 and FIG. 2 show the appearance of the polyol mixture with blowing agent after having been aged at room temperature for 24 hours.

Both HFCO-1233ZD and HFC-245fa appear to be more miscible in the polyether polyols than in the polyester polyols evaluated. At least 40 wt % of either blowing agent can be blended into the polyether polyols evaluated without phase separation. Furthermore, the miscibility of both blowing agents in polyester polyol is considered typical. All in all, HFCO-1233ZD has demonstrated excellent solubility in polyether polyols evaluated and adequate miscibility in polyester polyols tested.

TABLE 4

Polyols Evaluated in the Miscibility Study

| | Polyol Name | Polyol Type | Suppliers |
|---|---|---|---|
| 1 | Voranol ® 270 | Glycerine Initiated Polyether Polyol | Dow Chemical |
| 2 | Voranol ® 490 | Surcose/Glycerine Initiated Polyether Polyol | Dow Chemical |
| 3 | Voranol ® 800 | Aliphatic-amine initiated Polyether Polyol | Dow Chemical |
| 4 | Terate ® 4020 | Aromatic Polyester Polyol | Invista |
| 5 | Terate ® 2031 | Aromatic Polyester Polyol | Invista |
| 6 | Carpol ® GSP-280 | Surcose/Glycerine Initiated Polyether Polyol | Carpenter |
| 7 | Multranol ® 3901 | Polyether Polyol | Bayer |

TABLE 5

Miscibility of HFC-245fa and HFCO-1233ZD in Various Polyols

| | HFCO-1233ZD | | HFC-245fa | |
|---|---|---|---|---|
| Polyol Name | Phase Separation | Wt % Miscibility | Phase Separation | Wt % Miscibility |
| Voranol ® 270 | No | ≥40 | No | ≥40 |
| Voranol ® 490 | No | ≥40 | No | ≥40 |
| Voranol ® 800 | No | ≥40 | No | ≥40 |
| Terate ® 4020 | Yes | ~20 | Yes | ~18 |
| Terate ® 2031 | Yes | ~11 | Yes | ~20 |
| Carpol ® GSP-280 | No | ≥40 | No | ≥40 |
| Multranol ® 3901 | No | ≥40 | No | ≥40 |

Comparative Example 2

Foam core metal panels are used extensively in many different applications, such as walk-in coolers, walk-in freezer, cold storage and various commercial structures. One of the key performance criteria for metal panels is the R-value, i.e. the reciprocal of thermal conductivity. Therefore, the focus of this study was to compare the thermal conductivity of foams with either HFC-245fa or HFCO-1233ZD. The physical properties, such as foam reactivity, dimensional stability and compressive strength, were also compared.

The compositions of the formulation with different blowing agents are listed in Table 6. The panel foam formulation utilized was developed to yield a free rise density of about 1.9 lb/ft3. Using 20% overpacking, the resultant density of the foams was between 2.2 lb/ft3 and 2.3 lb/ft3. All the discontinuous panel foams were prepared by utilizing the Edge-Sweets high pressure foam machine with processing conditions given in Table 7. The foam was shot into a preheated mold, at 120° F. to 125° F., and allowed to cure in a 130° F. oven for 20 minutes before demolding. All physical property and thermal conductivity testing, was performed at least 24 hours after the foam was prepared.

One advantage of the present compositions, foams and articles is that in preferred embodiments the present blowing agents may be considered as a "drop-in" replacement for formulations currently using HFC-124fa in such applications. The discontinuous panel foam formulation used was developed for HFC-245fa as the blowing agent.

TABLE 6

Formulation of Discontinuous Panel Foam Evaluated

| Components | HFCO-1233ZD | HFC-245fa |
|---|---|---|
| Polyether Polyol | 65.0 | 65.0 |
| Polyester Polyol | 35.0 | 35.0 |
| Catalyst | 2.0 | 2.0 |
| Surfactant | 1.5 | 1.5 |
| Flame Retardant | 22.0 | 22.0 |
| Water | 2.0 | 2.0 |
| Blowing Agent | Equal-molar | 24.0 |
| Isocyanate, Index = 110 | 143.6 | 143.6 |

TABLE 7

Discontinuous Panel Foams' Preparation Parameters and Conditions

| Parameters | Conditions |
|---|---|
| Equipment | Edge-Sweets High Pressure Machine |
| Machine Pressure | 2000 psi/13.8 MPa |
| Foam Output | |
| Flow Output | 15 lb/min/6.8 kg/min |
| Polyol Temperature | 68-72° F./20-22° C. |
| Isocyanate Temperature | 68-72° F./20-22° C. |

TABLE 7-continued

Discontinuous Panel Foams' Preparation Parameters and Conditions

| Parameters | Conditions |
|---|---|
| Injection Time, blowing agent dependent | 3.0-3.1 seconds |
| Mold Temperature | 120° F.-125° F./48.9° C.-51.7° C. |
| Mold Dimensions | 2' × 1' × 2"/30.5 cm × 15.3 cm × 5.1 cm |

TABLE 8

Resultant Foam Density of Discontinuous Panel Foams

| Foam Density | HFCO-1233ZD | HFC-245fa |
|---|---|---|
| Free Rise Density, lb/ft3 | 1.87 | 1.86 |
| Free Rise Density, kg/m3 | 30.0 | 29.8 |
| Core Density, lb/ft3 | 2.21 | 2.23 |
| Core Density, kg/m3 | 35.2 | 35.2 |

The free rise density and core density of the discontinuous panel foams prepared are tabulated in Table 8. The resultant free rise and core foam densities are within 5% range of each other with HFCO-1233ZD and HFC-245fa as blowing agents. The comparison of physical properties, such as foam reactivity, dimensional stability and compressive strength, and thermal conductivity determined are relevant and valid for evaluation purposes.

The thermal conductivity of the foams were evaluated at five mean temperatures, 20° F./−7° C., 40° F./4° C., 55° F./13° C., 70° F./21° C. and 110° F./43° C. FIG. 3 and FIG. 4 show the initial and 28-day aged thermal conductivity of the foams respectively. The foams containing HFCO-1233ZD provides better thermal insulation value, approximately 5% lower initial thermal conductivity, than those with HFC-245fa at all evaluated temperatures. The difference in thermal conductivity increased to 10% after the foams were aged for 28 days. Compared to foam with HFC-245fa, those with HFCO-1233ZD may provide either similar thermal insulation value with thinner foam insulation or offer better energy efficiency at an equal foam thickness.

Comparative Example 3

Polyurethane foams with HFCO-1233ZD blowing agent provide comparable physical properties compared to those foams with HFC-245fa. Table 9 shows the foam reactivity, dimensional stability and compressive strength of both systems. Comparable foam reactivity and dimensional stability were found for both foams. Comparing the parallel and perpendicular compressive strength, the data show surprisingly and unexpectedly that that rigid polyurethane foam, especially poured-in place foam panels, with HFCO-1233ZD exhibits an advantageously greater isotropic cell structure than that with HFC-245fa.

TABLE 9

Foam Reactivity and Typical Properties

| | HFCO-1233ZD | HFC-245fa |
|---|---|---|
| Foam Reactivity | | |
| Gel Time, sec | 38 | 40 |
| Tack Free Time, sec | 150 | 127 |

TABLE 9-continued

Foam Reactivity and Typical Properties

| | HFCO-1233ZD | HFC-245fa |
|---|---|---|
| Dimensional Stability, Vol. % Change[1] | | |
| Cold, −29° C., Aged 28 Days | −0.69 | −0.17 |
| Hot, 90° C., Aged 28 Days | 2.60 | 4.18 |
| Hot & Humid, 70° C./95% RH, Aged 28 Days | 8.21 | 6.66 |
| Compressive Strength[2] | | |
| Perpendicular, psi | 17.3 | 20.8 |
| Perpendicular, kPa | 119.3 | 143.4 |
| Parallel, psi | 18.6 | 24.5 |
| Parallel, kPa | 128.2 | 168.9 |

[1]Dimensional stability of foam was evaluated as per ASTM D-2126-04
[2]Compressive strength of foam was evaluated as per ASTM D-1621

Comparative Example 4

The thermal conductivity, i.e. the reciprocal of R-value, reactivity, dimensional stability, compressive strength and flammability of polyurethane foams with HFCO-1233zd(E) were compared against those third generation liquid blowing agents, such as 245fa and cyclopentane, and second generation liquid blowing agent, 141b. Furthermore, properties of foams with various compositions of HFCO-1233zd(E)/cyclopentane blends were also evaluated aiming to seek a balance between superior foam properties and desired cost.

The compositions of a generic formulation with various blowing agents are listed in Table 10. This generic polyurethane foam formulation utilized was developed to yield a free rise density of about 1.9 lb/ft$^3$. With approximately 20% overpacking, the density of the prepared foams ranged from 2.2 lb/ft$^3$ to 2.3 lb/ft$^3$. All the foams were prepared by a hand-mixing method with processing conditions given in Table 11. The blended foam was poured into a mold at 104° F. and allowed to cure for 30 minutes before demolding. All physical property and thermal conductivity testing was performed at least 24 hours after the foam was prepared.

This experiment is considered as a "drop-in" replacement study to determine the blowing agent feasibility. The generic polyurethane foam formulation used in this study was developed using 245fa as blowing agent. The formulation used in this evaluation for other blowing agents is not necessarily optimal.

TABLE 10

Generic Formulation of Discontinuous Panel Foam Evaluated

| Components | HBA-2 | 245fa | Cyclopentane | 141b |
|---|---|---|---|---|
| Polyether Polyol | 65.0 | 65.0 | 65.0 | 65.0 |
| Polyester Polyol | 35.0 | 35.0 | 35.0 | 35.0 |
| Catalysts | 2.0 | 2.0 | 2.0 | 2.0 |
| Surfactant | 1.5 | 1.5 | 1.5 | 1.5 |
| Flame Retardant | 22.0 | 22.0 | 22.0 | 22.0 |
| Water | 2.0 | 2.0 | 2.0 | 2.0 |
| Blowing Agent | Equal-Molar | 24.0 | 12.5 | 20.9 |
| Isocyanate, Index = 110 | 143.6 | 143.6 | 143.6 | 143.6 |

TABLE 11

Hand-Mixing Method - Preparation Parameters and Conditions

| Parameters | Conditions |
|---|---|
| Component Temperature | |
| Polyol Premix | 68° F./20° C. |
| Isocyanate | 68° F./20° C. |
| Stirring | |
| Speed | 5000 RPM |
| Duration | 5 seconds |
| Mold Dimensions | 4" × 12" × 12"/10 cm × 30 cm × 30 cm |
| Mold Temperature | 104° F./40° C. |

TABLE 12A

Densities of Foams with Various Blowing Agents

| Physical Properties | HBA-2 | 245fa | Cyclopentane | 141b |
|---|---|---|---|---|
| Free Rise Density, lb/ft$^3$ | 1.83 | 1.77 | 1.85 | 1.92 |
| Free Rise Density, kg/m$^3$ | 29.3 | 28.3 | 29.7 | 29.8 |
| Core Density, lb/ft$^3$ | 2.35 | 2.29 | 2.31 | 2.32 |
| Core Density, kg/m$^3$ | 37.6 | 36.7 | 37.1 | 37.2 |

TABLE 12B

HBA-2/Cyclopentane mol % Ratio

| Physical Properties | 100/0 | 75/25 | 50/50 | 25/75 | 0/100 |
|---|---|---|---|---|---|
| Free Rise Density, lb/ft$^3$ | 1.83 | 1.83 | 1.79 | 1.71 | 1.85 |
| Free Rise Density, kg/m$^3$ | 29.3 | 29.3 | 28.6 | 27.3 | 29.7 |
| Core Density, lb/ft$^3$ | 2.35 | 2.33 | 2.33 | 2.37 | 2.35 |
| Core Density, kg/m$^3$ | 37.6 | 37.4 | 37.4 | 38.0 | 37.7 |

When compared the free rise density and core density of the polyurethane foams prepared with blowing agents or blowing agent blends, they are within 10% range of each other in Tables 12A and 12B. Since the foams share essentially identical density, comparisons of their physical, thermal properties are considered as fair and valid.

TABLE 13

Reactivity and Properties of Foams with Various Blowing Agents

| | HBA-2 | 245fa | Cyclopentane | 141b |
|---|---|---|---|---|
| Foam Reactivity | | | | |
| Gel Time, sec | 55 | 55 | 52 | 52 |
| Tack Free Time, sec | 100 | 100 | 95 | 95 |
| Dimensional Stability, ΔVol %[1] | | | | |
| −29° C., Aged 28 Days | −1.21 | −1.75 | −1.13 | −1.61 |
| 90° C., Aged 28 Days | 3.14 | 3.86 | 7.67 | 9.62 |
| 70° C./95% RH, Aged 28 Days | 3.83 | 3.98 | 6.42 | 14.96 |
| Compressive Strength[2] | | | | |
| Parallel, psi | 40.2 | 41.3 | 36.2 | 38.9 |
| Parallel, kPa | 277.5 | 284.5 | 249.9 | 268.0 |
| Perpendicular, psi | 27.2 | 28.8 | 24.0 | 27.7 |
| Perpendicular, kPa | 187.5 | 198.5 | 165.2 | 190.7 |

[1]Dimensional stability of foam was evaluated as per ASTM D-2126-04
[2]Compressive strength of foam was evaluated as per ASTM D-1621

According to the results in Table 13, foams with HBA-2 demonstrate reativity physical properties comparable to those with 245fa. Furthermore, they demonstrate significantly better dimensional stability at high temperatures than those with cyclopentane or 141b, and significantly higher compressive strength that those with cyclopentane.

TABLE 14

Foam Reactivity and Properties with Various Blowing Agents Blends
HBA-2/Cyclopentane mol % Ratio

| | 100/0 | 75/25 | 50/50 | 25/75 | 0/100 |
|---|---|---|---|---|---|
| Physical Properties | | | | | |
| Gel Time, sec | 55 | 54 | 53 | 52 | 52 |
| Tack Free Time, sec | 100 | 99 | 95 | 85 | 100 |
| Dimensional Stability, ΔVol %[1] | | | | | |
| −29° C., Aged 28 Days | −1.21 | −1.15 | −1.53 | −2.15 | −1.13 |
| 90° C., Aged 28 Days | 3.14 | 4.66 | 5.03 | 3.44 | 7.67 |
| 70° C./95% RH, Aged 28 Days | 3.83 | 3.40 | 5.93 | 5.58 | 6.42 |
| Compressive Strength[2] | | | | | |
| Parallel, psi | 40.2 | 40.0 | 35.0 | 35.8 | 36.2 |
| Parallel, kPa | 277.5 | 275.8 | 241.6 | 247.0 | 249.9 |
| Perpendicular, psi | 27.2 | 26.1 | 24.9 | 28.4 | 24.0 |
| Perpendicular, kPa | 187.5 | 180.0 | 171.4 | 195.8 | 165.2 |

[1]Dimensional stability of foam was evaluated as per ASTM D-2126-04
[2]Compressive strength of foam was evaluated as per ASTM D-1621

Referring to Table 14, blending 1233zd (HBA-2) with cyclopentane appears to enhance various physical properties when compared to foams with only cyclopentane. For instance, at high temperature conditions, such as 90° C. and 70° C./95% RH, the dimensional stability is improved as the concentration of HBA-2 increased in the blend. Also, it is important to stress that foams with 75/25 mol % HBA-2/cyclopentane provides almost identical foam reactivity and similar superior physical properties to foams blown with HBA-2 alone. However, mixtures of cyclopentane and HBA-2 are considered as flammable which probably require explosion-proof equipment for processing.

FIG. 5 and FIG. 6 show the initial and 28-day aged thermal conductivity of foams with various blowing agents respectively. Foams containing HBA-2 provide better thermal insulation value, approximately 4% lower initial thermal conductivity, than those with 245fa at all evaluated temperatures, 40° F./4° C., 55° F./13° C., 70° F./21° C. and 110° F./43° C. A similar phenomenon was also noted after 28 days aging at room temperature but with a wider discrepancy, about 6% between those curves. In other words, foams with HBA-2 retained its thermal insulation value better than their counterparts with HBA-2. Although foams with 141b appear to have better thermal insulation value than those with HBA-2 at higher temperatures, the trend begins to show a reverse behavior at temperatures approximately 45° F./7° C. and lower, which falls into the operating temperature range of pour-in-place applications, such as walk-in freezers and cold storage. Furthermore, after 28 days of aging, foams with HBA-2 demonstrate considerably better thermal insulation value than all blowing agents, including, 141b, at all evaluated temperatures. The thermal conductivity of foams with cyclopentane is the highest among all tested samples regardless of evaluated temperatures and aging durations. Furthermore, the thermal conductivity of foams with cyclopentane begins to level off when the evaluated temperatures are below approximately 75° F., reducing its effectiveness in cold storage applications, such as coolers and freezers that require foams with superior thermal insulation value at 20° F. and 55° F. correspondingly.

According to FIG. 7, although the thermal insulation value of foams deteriorates as the percentage of cyclopentane in the blend increases, the trend does not appear to be linear. Blending of up to 50 mol % of cyclopentane with HBA-2 demonstrates no significant impact on initial thermal conductivity throughout the temperatures evaluated. This is particularly beneficial to pour-in-place applications which are looking for foam with a balance of superior thermal properties and acceptable cost of blowing agent.

As illustrated in FIG. 8, the aged thermal conductivity of foams with a composition equal to or higher than 75 mol % cyclopentane appears to have a more noticeable plateau effect than the others. This phenomenon may not be favorable to cold chain application due to its low operation temperatures. Although certain HBA-2/cyclopentane blends may be able to provide a desired balance between properties and cost, foams with HBA-2 are still the best with respect to both initial and aged thermal insulation values. Also note that the HBA-2 foams retain their k-factor better than any of the blends evaluated.

TABLE 15A

Measured Flame Height of Foam Samples During the Flammability Test

| B2 Test Evaluation[1] | HBA-2 | 245fa | 141b | Cyclopentane |
|---|---|---|---|---|
| Flame Height, cm | 10.0 | 12.0 | 12.0 | 15.0 |

[1]Flammability of foams was evaluated as per DIN 4102-1: Class B2 Materials

TABLE 15B

Measured Flame Height of Foam Samples During the Flammability Test
HBA-2/Cyclopentane mol % Ratio

| B2 Test Evaluation[1] | 100/0 | 75/25 | 50/50 | 25/75 | 0/100 |
|---|---|---|---|---|---|
| Flame Height, cm | 10.0 | 11.0 | 12.0 | 13.0 | 15.0 |

[1]Flammability of foams was evaluated as per DIN 4102-1: Class B2 Materials

All foams were evaluated for flammability performance using the DIN 4102 B2 test method. In order to pass the DIN 4102-1: Class B2 material evaluation, the flame height could not surpass the gauge which located 15 cm above the ignition point during the first 15 seconds of the test. According to Table 15A and 15B, Foams with HBA-2 has the best flame retardancy when compared to those with 245fa, 141b or cyclopentane. Foams with cyclopentane only passed the evaluation marginally. For the blends, as the concentration of cyclopentane increases, the flame retardancy decreases.

What is claimed is:

1. A poured-in place polyurethane foam comprising: a polymeric foam structure including a plurality of closed cells therein that comprise a gas comprising trans-1-chloro-3,3,3-trifluoropropene (HFCO-1233zd(E)) and cyclopentane wherein trans-1-chloro-3,3,3-trifluoropropene (HFCO-1233zd(E)) is provided an amount of from 50 mole % to 75 mole % and cyclopentane is provided in an amount from 25 mole % to 50 mole %, wherein the foam is a class B2 material, according to test method DIN 4102 B2, wherein the foam exhibits an initial thermal conductivity of about 0.13 BTU·in/ft$^2$·h at about 40° F. to about 0.16 BTU·in/ft$^2$·h at about 110° F.

2. The poured-in place polyurethane foam of claim 1 where said cells contain a gas comprising HFCO-1233zd(E) and cyclopentane and at least one additional agent selected from the group consisting of water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2 dichloroethylene; methylal, methyl formate; 1-chloro-1,2,2,2-tetrafluoroethane (HCFC-124); 1,1-dichloro-1-fluoroethane (HCFC-141b); 1,1,1,2-tetrafluoroethane (HFC-134a); 1,1,2,2-tetrafluoroethane (HFC-134); 1-chloro 1,1-difluoroethane (HCFC-142b); 1,1,1,3,3-pentafluorobutane (HFC-365mfc); 1,1,1,2,3,3,3-heptafluoropropane (HFC-227ea); trichlorofluoromethane (CFC-11); dichlorodifluoromethane (CFC-12); dichlorofluoromethane (HCFC-22); 1,1,1,3,3,3-hexafluoropropane (HFC-236fa); 1,1,1,2,3,3-hexafluoropropane (HFC-236e); 1,1,1,2,3,3,3-heptafluoropropane (HFC-227ea), difluoromethane (HFC-32); 1,1-difluoroethane (HFC-152a); 1,1,1,3,3-pentafluoropropane (HFC-245fa); 1,3,3,3-tetrafluoropropene (HFO-1234ze); 1,1,1,4,4,4-hexafluorobut-2-ene (HFO-1336mzzm); butane; isobutane; normal pentane; isopentane; and combinations thereof.

3. The poured-in place polyurethane foam of claim 1 having a free rise density of greater than or equal to 1.71 lb/ft$^3$.

4. The poured-in place polyurethane foam of claim 1 having a core density of greater than or equal to 2.33 lb/ft$^3$.

5. A pour-in place foam premix comprising a polyol; a blowing agent comprising trans-1-chloro-3,3,3-trifluoropropene (HFCO-1233zd(E)) and cyclopentane; at least one surfactant; and at least one catalyst, wherein trans-1-chloro-3,3,3-trifluoropropene (HFCO-1233zd(E)) is provided an amount of from about 50 mole % to less than about 100 mole % and cyclopentane is provided in an amount from greater than about 0 mole % to about 50 mole % based on the total weight of the blowing agent, wherein the foam is a class B2 material, according to test method DIN 4102 B2, wherein the foam exhibits an initial thermal conductivity of about 0.13 BTU·in/ft$^2$·h at about 40° F. to about 0.16 BTU·in/ft$^2$·h at about 110° F.

6. The pour-in place foam premix of claim 5 wherein the blowing agent further comprises one or more additional blowing agents selected from the group consisting of water, organic acids that produce $CO_2$ and/or CO, hydrocarbons; ethers, halogenated ethers; esters, alcohols, aldehydes, ketones, pentafluorobutane; pentafluoropropane; hexafluoropropane; heptafluoropropane; trans-1,2 dichloroethylene; methylal, methyl formate; 1-chloro-1,2,2,2-tetrafluoroethane (HCFC-124); 1,1-dichloro-1-fluoroethane (HCFC-141b); 1,1,1,2-tetrafluoroethane (HFC-134a); 1,1,2,2-tetrafluoroethane (HFC-134); 1-chloro 1,1-difluoroethane (HCFC-142b); 1,1,1,3,3-pentafluorobutane (HFC-365mfc); 1,1,1,2,3,3,3-heptafluoropropane (HFC-227ea); trichlorofluoromethane (CFC-11); dichlorodifluoromethane (CFC-12); dichlorofluoromethane (HCFC-22); 1,1,1,3,3,3-hexafluoropropane (HFC-236fa); 1,1,1,2,3,3-hexafluoropropane (HFC-236e); 1,1,1,2,3,3,3-heptafluoropropane (HFC-227ea), difluoromethane (HFC-32); 1,1-difluoroethane (HFC-152a); 1,1,1,3,3-pentafluoropropane (HFC-245fa); 1,3,3,3-tetrafluoropropene (HFO-1234ze); 1,1,1,4,4,4-hexafluorobut-2-ene (HFO-1336mzzm); butane; isobutane; normal pentane; isopentane; and combinations thereof.

7. The pour-in place foam premix of claim 5 wherein the foam premix has a foam reactivity gel time from 52 to 55 seconds.

8. The pour-in place foam premix of claim 5 wherein the foam premix has a foam reactivity tack free time from 85 to 100 seconds.

9. The poured-in place polyurethane foam of claim 1 wherein the foam exhibits a thermal conductivity after its premixed is aged for 28 days of about 0.15 BTU·in/ft$^2$·h at about 40° F. to about 0.18 BTU·in/ft$^2$·h at about 110° F.

* * * * *